United States Patent

Baba

[11] Patent Number: 5,748,583
[45] Date of Patent: May 5, 1998

[54] INFORMATION RECORDING/REPRODUCING APPARATUS WITH COUNTER MEANS ACCESSIBLE BY SYSTEM AND SERVO PROCESSING UNITS

[75] Inventor: Hisatoshi Baba, Yokohama, Japan

[73] Assignee: Canon Kabushiki Kaisha, Tokyo, Japan

[21] Appl. No.: 522,117

[22] Filed: Aug. 31, 1995

[30] Foreign Application Priority Data

Sep. 2, 1994 [JP] Japan ................................ 6-209827
Aug. 31, 1995 [JP] Japan ................................ 7-223206

[51] Int. Cl.$^6$ .................................................. G11B 20/00
[52] U.S. Cl. ........................... 369/44.28; 369/124; 369/54
[58] Field of Search ............................. 369/44.28, 44.29, 369/44.32, 44.34, 32, 47, 48, 50, 54, 44.35, 124; 360/77.02, 77.03, 77.04, 78.06, 78.07, 78.08, 78.14

[56] References Cited

U.S. PATENT DOCUMENTS

| | | | |
|---|---|---|---|
| 5,195,067 | 3/1993 | Yanigi | 369/44.28 |
| 5,260,923 | 11/1993 | Baba | 369/44.28 |
| 5,347,503 | 9/1994 | Koyama et al. | 369/44.32 |
| 5,379,166 | 1/1995 | Tsukada et al. | 360/78.14 |
| 5,398,222 | 3/1995 | Kim | 369/44.28 |
| 5,404,346 | 4/1995 | Koyama et al. | 369/44.32 |
| 5,428,590 | 6/1995 | Ogino | 369/44.28 |
| 5,523,988 | 6/1996 | Chiba | 369/50 |
| 5,535,184 | 7/1996 | Miura et al. | 369/32 |
| 5,570,330 | 10/1996 | Okawa | 369/44.34 |

OTHER PUBLICATIONS

Nagata, et al. "Magneto–optical Disc Drive" 148–th Oki Denki Gihou, vol. 57, No. 4, p. 131 through 136, Oct. 1990.

*Primary Examiner*—Thang V. Tran
*Attorney, Agent, or Firm*—Fitzpatrick, Cella, Harper & Scinto

[57] ABSTRACT

An information recording/reproducing apparatus for executing recording of information on and/or reproduction of information from a recording medium, upon reception of an instruction from a host computer. The apparatus includes (1) a single calculation device for, alternatively and time-divisionally, performing (i) a system processing for handling the instruction from the host computer and (ii) a seek processing for moving an information reproduction head to a target track, and (2) a counter, incorporated into the calculation device. In the seek processing, the number of tracks which the head has traversed is counted and, in the system processing, the number of tracks thus counted is monitored and the information to be reproduced by the head is prepared based on the monitored number of tracks.

2 Claims, 10 Drawing Sheets

INFORMATION RECORDING/REPRODUCING APPARATUS WITH COUNTER MEANS ACCESSIBLE BY SYSTEM AND SERVO PROCESSING UNITS

BACKGROUND OF THE INVENTION

1. Field of the Invention

The present invention relates to an information recording/reproducing apparatus which optically records and/or reproduces information on and/or from an information recording medium.

2. Related Background Art

Figures 1, 1A:
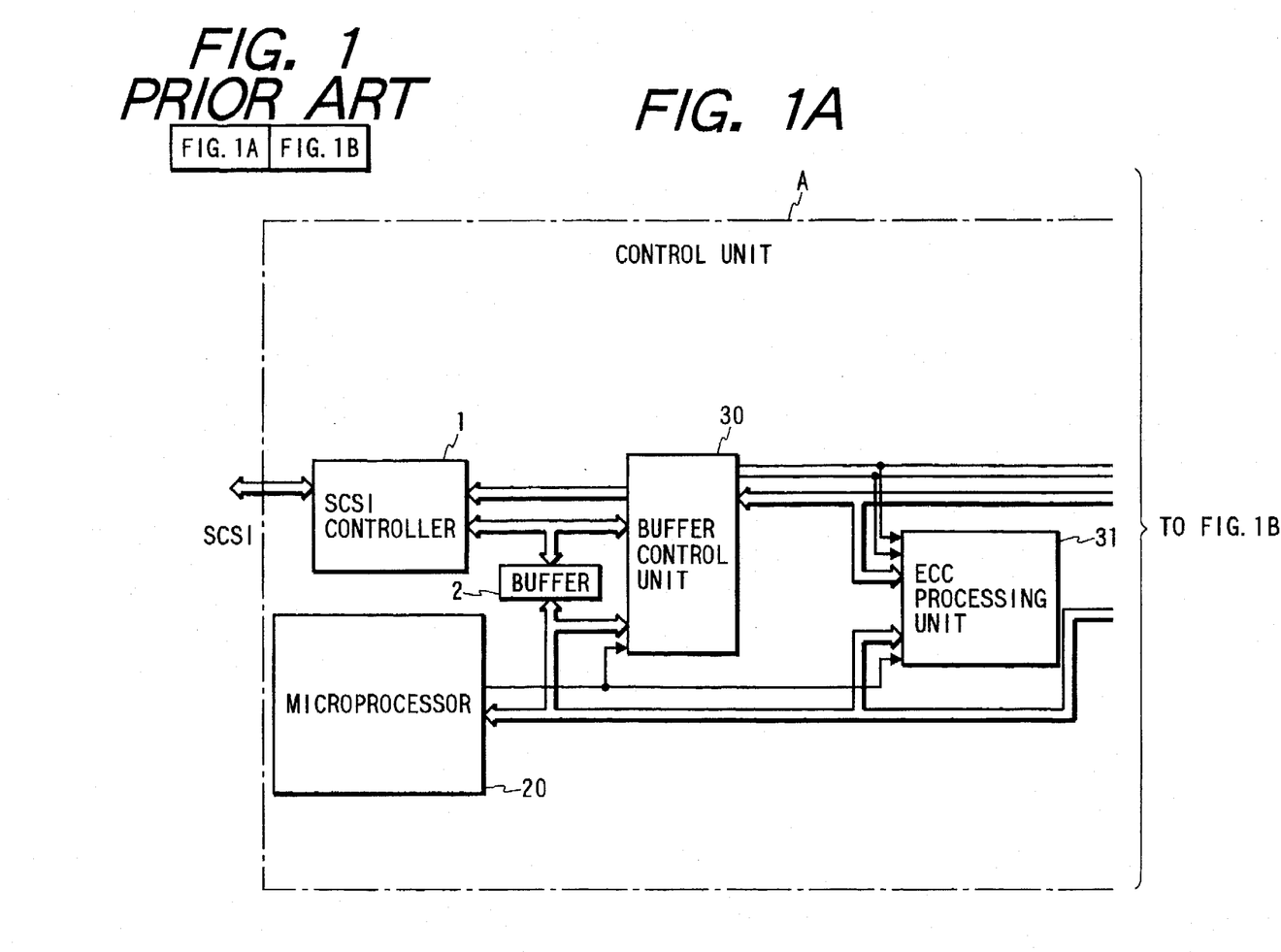
Figure 1B:
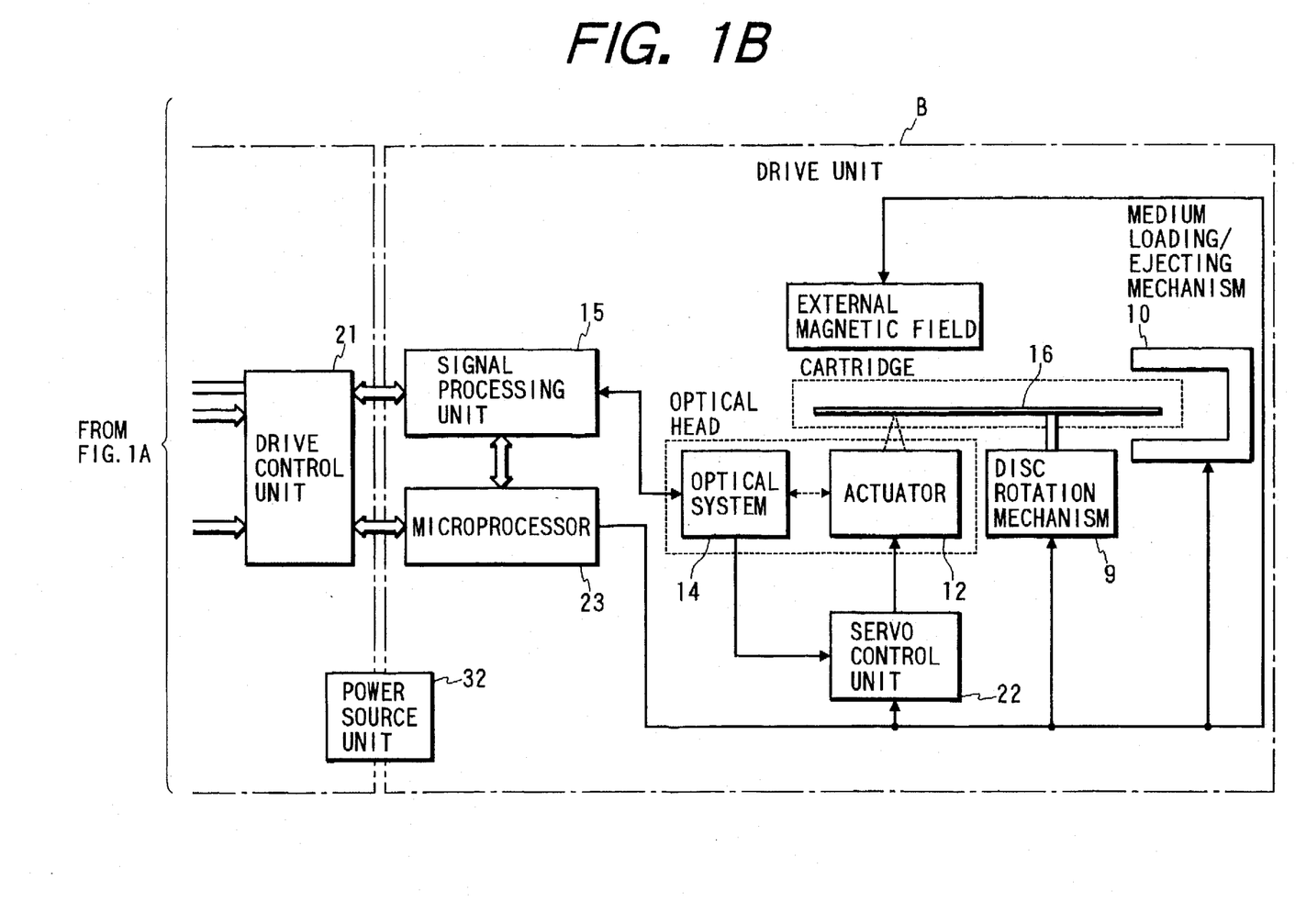

FIGS. 1A and 1B are block diagrams showing a conventional magneto-optical disc apparatus. The magneto-optical disc apparatus shown in FIGS. 1A and 1B is disclosed in "Magneto-optical Disc Apparatus", 148-th Oki Denki Gihou, Vol. 57, No. 4. The magneto-optical disc apparatus shown in FIGS. 1A and 1B is mainly constituted by a control unit A, a drive unit B, and a power source unit 32.

The control unit A comprises an SCSI controller 1, a buffer memory 2, a drive control unit 21 for controlling data transfer to the drive unit B, and the action of the drive unit B, an ECC processing unit 31 for performing error correction of reproduced data, a buffer control unit 30 for controlling the data buffer, a microprocessor 20 for controlling these units, and the like. A medium loading/ejecting mechanism 10 is arranged in the drive unit B. With this mechanism, a magneto-optical disc 16 can be loaded into and ejected from the drive unit main body. The magneto-optical disc 16 is rotated at a predetermined velocity by the drive action of a disc rotation mechanism 9. An external magnetic field (magnetic head) is arranged above the upper surface of the magneto-optical disc 16, and an optical head including an optical system 14 and an actuator 12 is arranged below the lower surface of the magneto-optical disc 16. The optical system 14 includes a semiconductor laser serving as a light source, an objective lens for focusing a laser beam from the semiconductor laser to a very small beam spot, a photosensor for detecting light reflected by the magneto-optical disc 16, and the like. The servo control unit 22 performs tracking control and focusing control of the beam spot of the optical system 14 on the basis of the detection signal from the photosensor.

When information is recorded on the magneto-optical disc 16, recording data is modulated by a signal processing unit 15, and the intensity of the beam spot of the optical system 14 is modulated on the basis of the modulated signal. The beam spot is irradiated onto the magneto-optical disc 16, and a predetermined external magnetic field is applied to the disc 16, thereby recording an information train on an information track. On the other hand, when recorded information is reproduced, the optical system 14 irradiates a laser beam of a reproduction power, and the signal processing unit 15 performs predetermined signal processing on the basis of the detection signal from the photosensor, thereby reproducing recorded information. Reproduced data is transferred to a host computer via the control unit A. The respective units described above of the drive unit B are controlled by a microprocessor 23.

However, the conventional magneto-optical disc apparatus requires microprocessors, respectively, in the control unit and the drive unit. Although not shown in FIGS. 1A and 1B, these microprocessors require memories for storing programs, parameters, and the like. In addition to these microprocessors, the drive control unit 21 is required to smoothly control the control unit and the drive unit. As described above, the conventional magneto-optical disc apparatus requires a plurality of microprocessors and memories, and the drive control unit, and it is difficult to attain cost and size reductions of the apparatus.

Upon execution of a seek action in the information recording/reproducing mode, the microprocessors in both the control unit and the drive unit, especially, the microprocessors, which perform the seek action, independently operate in accordance with their procedures, thus disturbing a high-speed seek action. For example, a seek command from the host computer is interpreted by the microprocessor of the control unit, and the microprocessor of the control unit issues a command to the microprocessor of the drive unit. Thereafter, the microprocessor of the drive unit interprets the command to execute the seek action, resulting in a time-consuming sequence. Furthermore, upon execution of the seek action of the drive unit, the microprocessor of the drive unit supplies an end message of the seek action to the control unit, and the control unit then performs recording/reproducing of data or reproduction of addresses.

However, in order to assure reliable data reproduction, the microprocessor of the drive unit cannot supply an end message of the seek action until the servo system reaches a completely stable state. For this reason, a long period of time is required to confirm stabilization of the servo system, and the seek time cannot be shortened.

Depending on the disc position to be subjected to recording/reproducing, especially, when one track is divided into a plurality of sectors, a rotation wait time ranging from an average of a ½ revolution of the disc to a maximum of one revolution of the disc is required as an idle time so as to detect the start position of a target sector. As a result, the access time to a data sector corresponds to a total of the seek time and the rotation wait time, thus disturbing realization of a high-speed optical disc apparatus.

Conventionally, in order to prevent data on neighboring tracks from being destroyed by a tracking error of a laser beam caused when the apparatus receives an external vibration during recording, the microprocessor 23 of the drive unit monitors the servo state of the laser beam to detect any tracking error of the laser beam.

Since such an abnormality often destroys information on neighboring tracks, it must be removed immediately. In addition, since the microprocessor 20 of the control unit must recognize the position of a sector to which information has been recorded, the microprocessor 23, which has detected the tracking error of the laser beam, must immediately inform an occurrence of the abnormality to the microprocessor 20.

Upon an occurrence of such an abnormality, if the communication speed between the two microprocessors is low, neighboring tracks may be seriously damaged, or the sector where the abnormality has occurred may be recognized erroneously.

SUMMARY OF THE INVENTION

The present invention has been made in consideration of the above-mentioned problems, and has as its object to provide an information recording/reproducing apparatus which can realize cost and size reductions, and high-speed processing.

In order to achieve the above object, there is provided an information recording/reproducing apparatus for executing recording of information on and/or reproduction of information from a recording medium upon reception of an instruction from a host computer, comprising:

system processing means for processing the instruction from the host computer;

servo control processing means for executing servo control for positioning a recording/reproducing head at a target track by interrupting the system processing; and counter means which can be utilized by the servo control processing means and the system processing means.

The above and other objects and features of the present invention will become apparent from the following description of the embodiments taken in conjunction with the accompanying drawings.

BRIEF DESCRIPTION OF THE DRAWINGS

FIG. 1, which is composed of FIGS. 1A and 1B, is a block diagram showing a conventional magneto-optical disc apparatus;

DETAILED DESCRIPTION OF THE PREFERRED EMBODIMENTS

Figure 2:
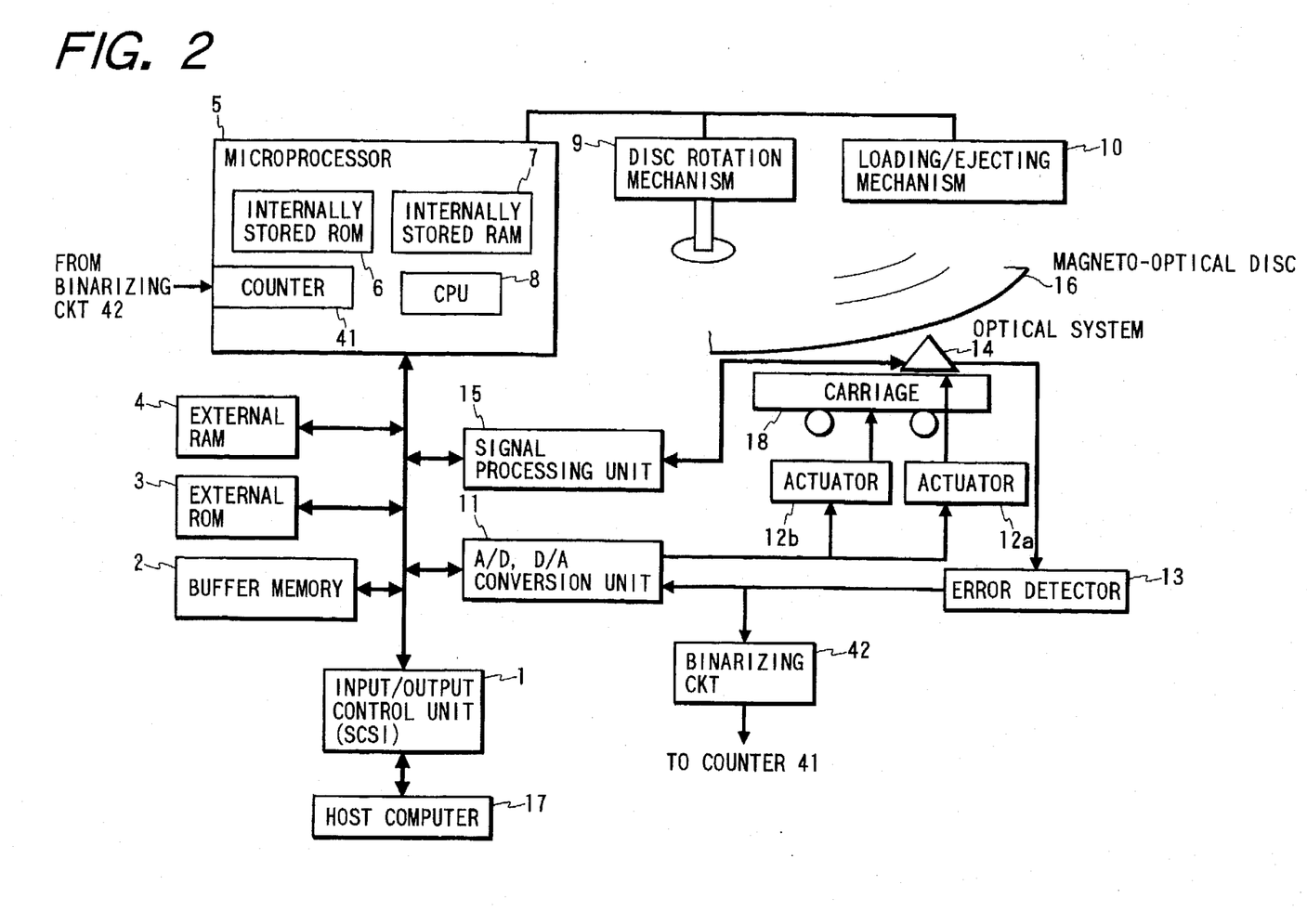
FIG. 2 is a block diagram showing an optical information recording/reproducing apparatus according to the first embodiment of the present invention.

The preferred embodiments of the present invention will be described in detail hereinafter with reference to the accompanying drawings. FIG. 2 is a block diagram showing an information recording/reproducing apparatus according to the first embodiment of the present invention. Note that the same reference numerals in FIG. 2 denote the same parts as in the magneto-optical disc apparatus shown in FIGS. 1A and 1B. More specifically, a buffer memory 2, a disc rotation mechanism 9, an optical system 14, a signal processing unit 15, and a magneto-optical disc 16 are the same as those shown in FIGS. 1A and 1B. An input/output control unit 1 and a loading/ejecting mechanism 10 respectively correspond to the SCSI controller 1 and the medium loading/ejecting mechanism 10 shown in FIGS. 1A and 1B.

A microprocessor 5 is the only processor circuit arranged in the apparatus, and comprises a CPU 8, internal memories, i.e., an internal ROM 6 and an internal RAM 7 arranged in the same chip as the CPU 8, and a counter 41. In addition to these internal memories, the apparatus comprises an external ROM 3 and an external RAM 4 for storing programs, parameters, and the like. An error detector 13 detects any positional error of an optical head, i.e., focusing and tracking errors, on the basis of the detection signal from a photosensor arranged in the optical system 14, and the detected error signals are converted into digital values by an A/D, D/A conversion unit 11. Thereafter, the digital values are supplied to the microprocessor 5. An actuator 12a comprises a tracking actuator for moving an objective lens in the optical system 14 in the tracking direction, and a focusing actuator for moving the objective lens in the focusing direction. An actuator 12b comprises a linear motor for driving a carriage 18 to move the optical head in the track crossing direction.

The optical head is constituted by integrating the optical system 14 and the actuator 12a, and moves in the radial direction of the magneto-optical disc 16 upon driving of the actuator (linear motor) 12b to be able to access a desired track. A tracking error signal obtained by the error detector 13 is converted into logic-level data by a binarizing circuit 42, and the converted data is output to the counter 41 in the microprocessor 5. The counter 41 counts the number of pulses output from the binarizing circuit 42 during the seek action of the optical head, thus counting tracks to detect the position of a laser beam.

Furthermore, the function of the servo control unit 22 in FIGS. 1A and 1B is shared by the microprocessor 5, the A/D, D/A conversion unit 11, and the error detector 13 in this embodiment. More specifically, in this embodiment, servo control is realized by digital servo control, and the microprocessor 5 performs predetermined calculation processing on the basis of error signals detected by the error detector 13. The microprocessor 5 outputs the calculation result to the actuator 12a via the A/D, D/A conversion unit 11, thus attaining tracking servo and focusing servo. A host computer 17 is an apparatus for issuing instructions such as a recording/reproducing instruction to the information recording/reproducing apparatus, and the information recording/reproducing apparatus is connected to the host computer 17 as an external storage apparatus. The input/output control unit 1 receives an instruction from the host computer 17 and supplies the received instruction to the microprocessor 5.

The microprocessor 5 serves as a main control unit of the information recording/reproducing apparatus of this embodiment. That is, the microprocessor 5 controls the input/output action of recording/reproducing data (note that the input/output action also will be referred to as the recording/reproducing action hereinafter), e.g., performs control for temporarily storing recording data transferred from the host computer 17 in the buffer memory 2 and supplying the recording data from the buffer memory 2 to the signal processing unit 15, and control for transferring reproduction data read out from the magneto-optical disc 16 by the optical head to the host computer 17. Also, the microprocessor 5 performs velocity control in the seek action control of the optical head by controlling the position control action (including the tracking/focusing action) of a laser beam and the linear motor 12b. Note that a buffer control unit 30, an ECC processing unit 31, and a power source unit 32 are not shown in FIG. 2.

The magneto-optical disc 16 is divided into a plurality of zones in the radial direction, and each zone is formatted to increase the data recording density. More specifically, the magneto-optical disc 16 is formatted in a so-called zone CAV format. In general, the data recording density of the magneto-optical disc is determined by the track pitch and the line density in the tracking direction. Since the disc has a disc shape, the circumferential length varies depending on the radial position. For example, the circumferential length of a track at the radial position of 2 cm is 4×3.14 cm, while the circumferential length of a track at the radial position of 4 cm is 8×3.14 cm. In this manner, the line direction distance increases toward the outer periphery. For this reason, in order to increase the disc capacity, the data recording frequency must be changed in correspondence with the radial position so as to set a constant line density and a constant rotational speed of the disc independently of the inner or outer periphery of the disc. Thus, the radius of the disk is divided into, e.g., 20 zones, and data recording/reproducing frequencies are determined in units of zones, thus setting the recording/reproducing frequencies suitable for the respective radial positions. One track is divided into data of a plurality of sectors, and the number of sectors varies depending on the zone positions. Therefore, in order to perform a seek action of the optical head to a target track, a suitable data recording/reproducing frequency (to be referred to as a data clock hereinafter) is set in correspondence with each zone.

Figure 3:
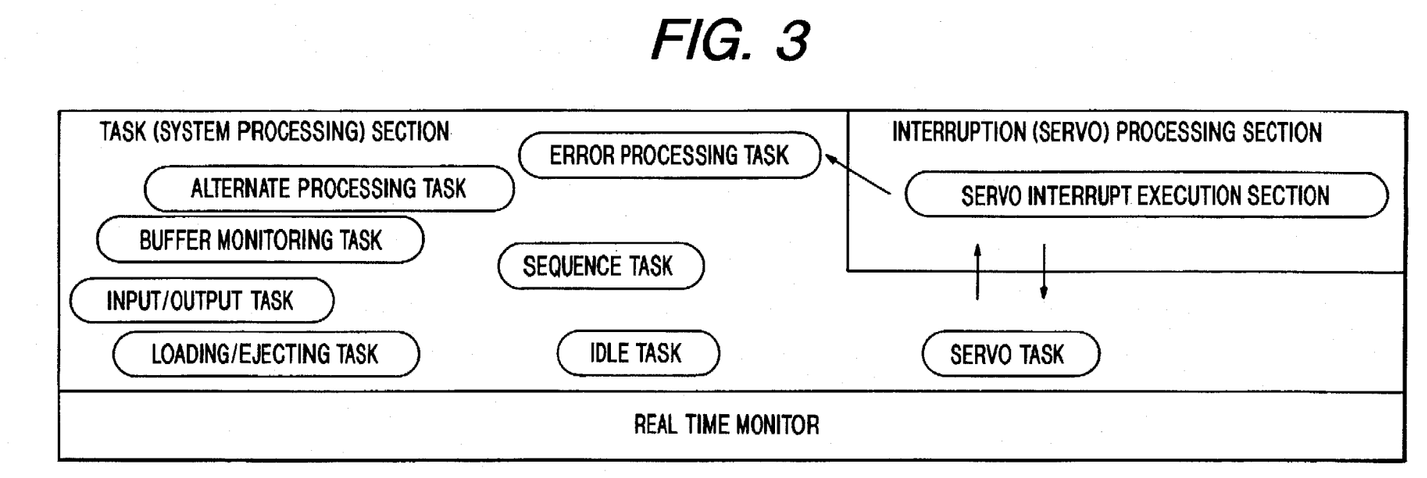
FIG. 3 is a schematic view showing the configuration of a program of the embodiment shown in FIG. 2.

FIG. 3 is a schematic view showing the configuration of the program in the microprocessor 5. In this case, the program has a task management type configuration based on a real time monitor (having the same meaning as a real time OS). For example, when the host computer 17 issues a recording instruction, the priority of an input/output task in FIG. 3 is set to be high (designated by an event), and the input/output task is started. In the input/output task, the input/output control unit 1 receives a command and performs an action, and the microprocessor 5 receives a command. At this time, other tasks are set in a waiting or halt state. Servo control such as focusing/tracking control is processed in parallel in a time-divisional manner as interrupt processing. Upon completion of input/output processing, the priority of the input/output task is lowered, and another task with high priority is started instead. In this embodiment, control of data to be recorded/reproduced, loading/ejecting control, error processing of the magneto-optical disc apparatus, and the like are executed by the task management method, and servo control, such as the position control, seek control, and the like of the optical head is apparently executed parallel to execution of the tasks in a time-divisional processing format.

Figure 4:
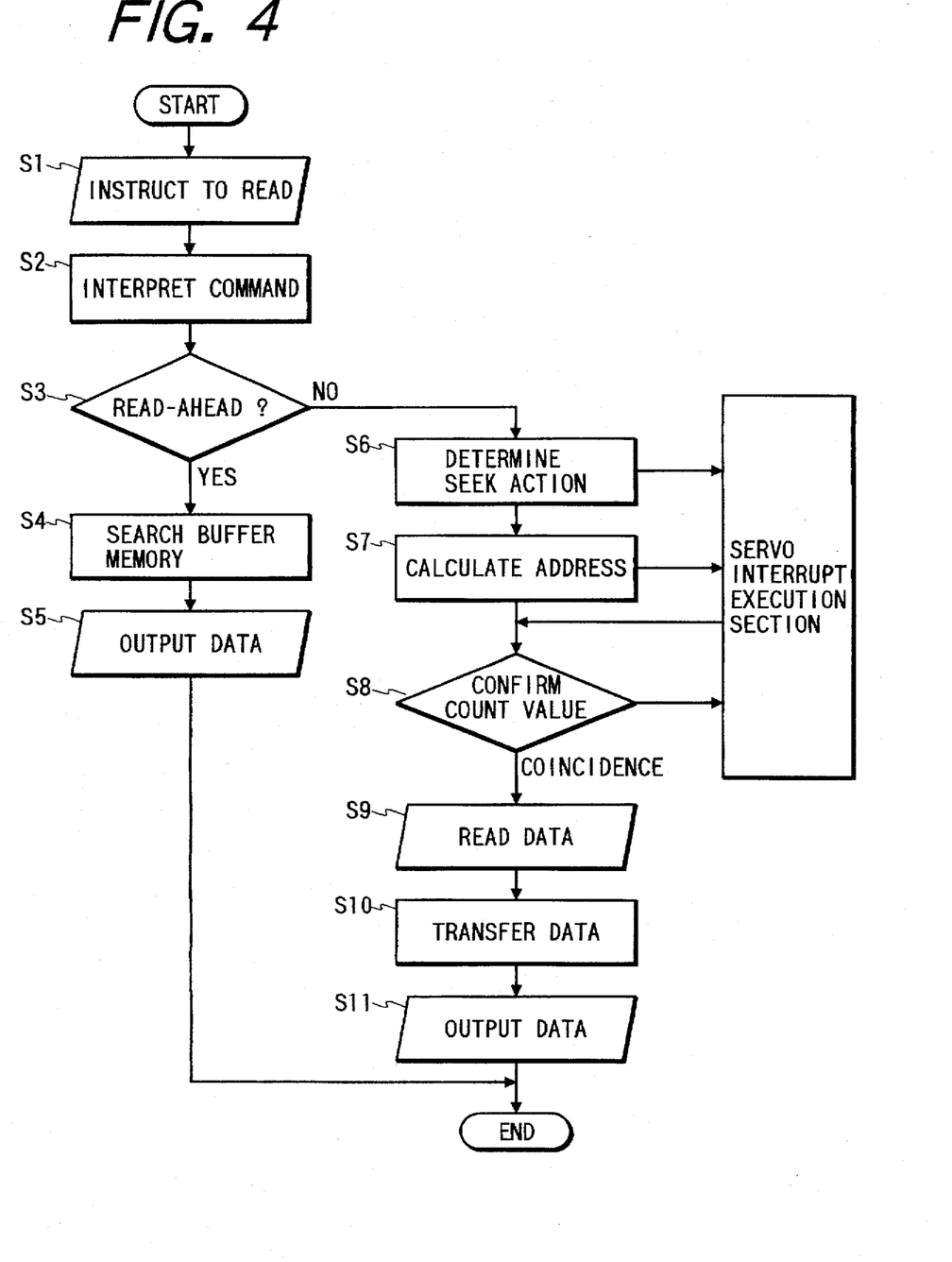
FIG. 4 is a flow chart showing the action of a task section upon generation of a read instruction in the embodiment shown in FIG. 2.

The detailed action of this embodiment will be described below. FIG. 4 is a flow chart showing, e.g., the control action upon reading of data of the magneto-optical disc apparatus. The action will be explained below with reference to FIG. 4 together with the block diagrams shown in FIGS. 2 and 3. Referring to FIG. 4, a data reading instruction from the host computer 17 is read by the input/output control unit 1 (S1). At this time, as described above, the input/output task is started and executed. The CPU 8 in the microprocessor 5 interprets a command (S2). Then, the input/output task is halted, and a series of reading sequences are executed by a sequence task. More specifically, it is checked if data is read ahead. In this case, the buffer monitoring task checks if data to be obtained is already stored in the buffer memory 2 (S3). If YES in step S3, the buffer memory 2 is searched (S4) to output predetermined data to the host computer 17 via the input/output control unit 1. At this time, the sequence task controls the tasks, i.e., the buffer monitoring task and the input/output task.

On the other hand, if it is determined in step S3 that data is not read ahead, a seek action is determined, the servo task is started, and an instruction indicating this is issued to a servo interrupt execution section. Thus, the control of an interrupt processing section is switched to the seek action mode (S6). During the processing executed so far as well, the interrupt processing section has been executing servo control actions, and in this embodiment, the interrupt interval is set to be 20 μsec. Although the servo control has already been switched to the seek action mode, the task section subsequently performs an address calculation (S7). After the address calculation, the calculated information is supplied to the servo interrupt execution section. Upon reception of the calculation result, the interrupt processing section of the CPU 8 executes a seek action based on a velocity control action. During this action, the servo task is set in a waiting state, i.e., another task with high priority operates in the task section until a seek end status interruption is generated by the interrupt processing section. In this case, the other task corresponds to the buffer monitoring task. The action of the buffer monitoring task will be described later.

Figure 5:
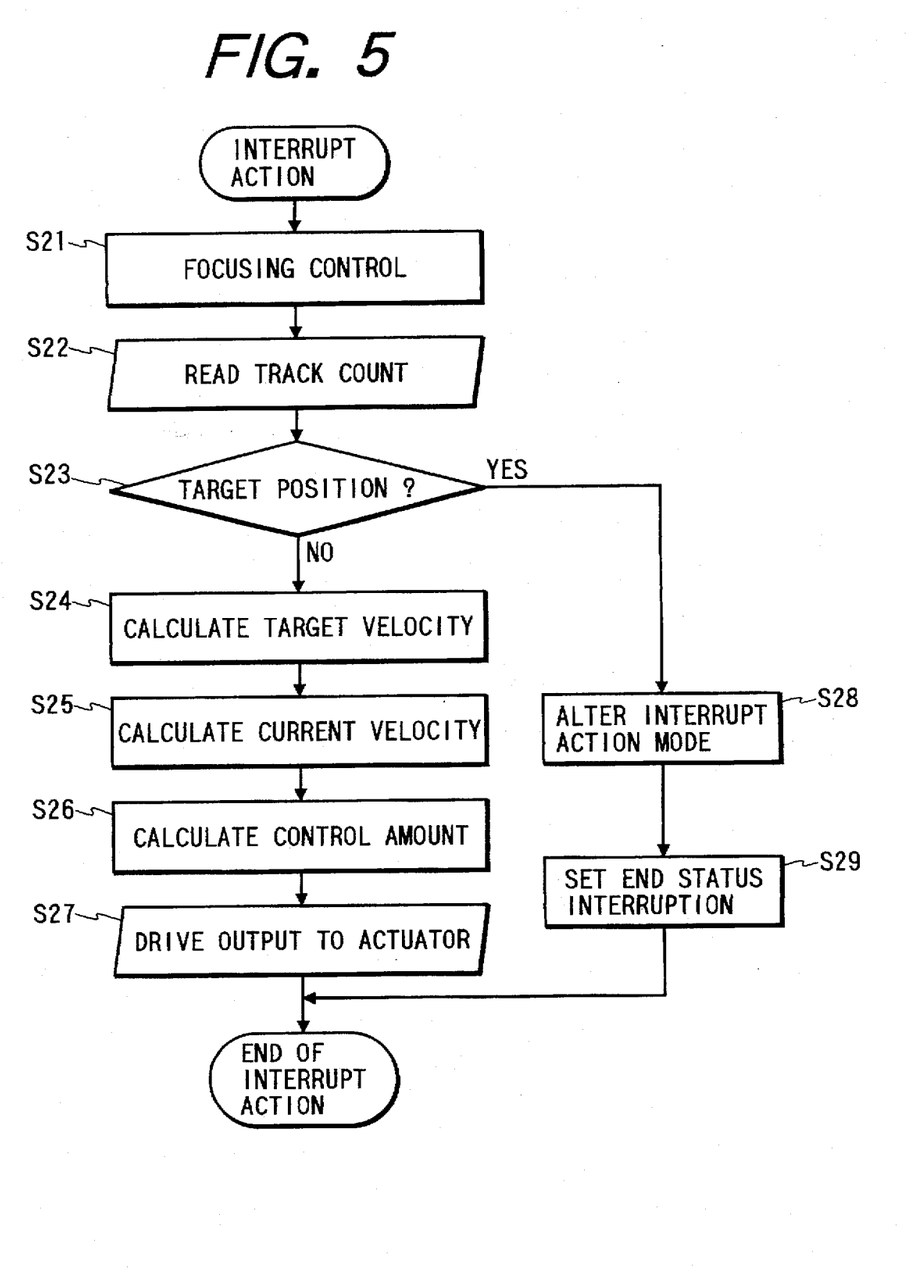
FIG. 5 is a flow chart showing the action of an interrupt processing section upon execution of the seek action in the embodiment shown in FIG. 2.

The action of the interrupt processing section which performs seek control will be described in detail below with reference to the flow chart shown in FIG. 5. As described above, the time-divisional actions of this embodiment are executed at 20-μsec intervals. When an interrupt action is started, a focusing control action is performed (S21). In this case, the focusing error signal obtained from the error detector 13 is converted into a digital signal by the A/D, D/A conversion unit 11, and the digital signal is supplied to the microprocessor 5. Based on the digital signal, the CPU 8 calculates a focusing control signal using a predetermined arithmetic formula stored in the internal ROM 6 and predetermined parameters stored in the internal RAM 7, and a drive signal is output to the actuator 12a via the A/D, D/A conversion unit 11. Then, a track count value is read (S22). The track count value is generated based on the tracking error signal obtained from the error detector 13, such that the tracking error signal is binarized by the binarizing circuit 42 shown in FIG. 2, and the binarized data is counted by the counter 41 incorporated in the microprocessor 5.

The track count value is compared with a target track count value (S23). If the two values coincide with each other, i.e., if the optical head has reached the target position, the interrupt action mode is altered (S28), and the seek end status is stored in the internal RAM 7 (S29), thus ending the processing. This alteration executes the interrupt processing of a mode for controlling a laser beam to trace the track as a track tracing mode, thereafter. On the other hand, if it is determined in step S23 that the two values do not coincide with each other, a target velocity $V_{ref}$ is calculated from the current track count value (S24), and then, the current velocity $V_n$ is calculated (S25). The velocity control method executed in this embodiment will be described later. Based on these calculated values, a seek control amount is calculated using an arithmetic formula stored in the internal ROM 6 (S26). The obtained control amount is output to the actuator 12b via the A/D, D/A conversion unit 11 (S27). Upon completion of the above-mentioned operation, the interrupt processing section ends its action, and the processing shifts to the task section. The task section re-starts the action which has been executed when the interrupt processing was started. Thereafter, when an interrupt is generated again, the interrupt processing in steps S21 to S27 is executed.

In a state wherein the interrupt processing section is executing seek control, the task section starts the buffer monitoring task. The buffer monitoring task monitors the value of the counter 41 during the seek operation, and can detect the current track position and the zone, where a laser beam is currently irradiated, on the basis of the count value. The buffer monitoring task sets the data clock corresponding to the current zone in the signal processing section 15 to allow reproduction of information from the disc.

When seek control is executed and the optical head reaches a position near the target track, since a laser beam is sufficiently decelerated, an address recorded on the magneto-optical disc 16 and indicating the track number can be read. When the buffer monitoring task recognizes the address, it changes the track count value indicated by the counter 41 to be the accurate count value corresponding to the actually reproduced address value. In this manner, a track count error can be corrected.

Furthermore, when the buffer monitoring task confirms based on the count value of the counter 41 that the optical head has reached the target track (S8 in FIG. 4), the control mode is switched to the data reproduction mode, and data is read (S9). The buffer monitoring task transfers the reproduced data to the buffer memory 2 (S10), and sequentially outputs the data to the input/output control unit 1 (S11). In this manner, data requested by the host computer 17 can be reproduced. In this stage, although the interrupt processing section has almost completed a seek action or is executing a tracking pull-in action, reproduction of address data or reading of recorded data can be performed.

As described above, since the buffer monitoring task of the task section reads the counter 41 for counting tracks before completion of the seek action of the interrupt processing section to detect the arrival of the optical head to the target track, and immediately reproduces data, the time required for accessing required data can be shortened. Since the data clock is sequentially changed in correspondence with the counter 41 for counting tracks, address data can be reproduced even at a position near the boundary of adjacent zones. In a conventional method of setting the data clock before a seek action, when the seek action is performed to a position near the zone boundary, if the optical head reaches a neighboring zone, address data cannot be read, and the access time is undesirably prolonged.

Since this embodiment uses the counter which can be operated by both the interrupt processing section and the task section in the single CPU, the seek action of the interrupt processing section and the data processing action of the task section can be executed time-divisionally, and do not contend in terms of their execution timings with respect to the counter. For these reasons, both the interrupt processing section and the task section can refer to and change the counter.

Figure 6A:
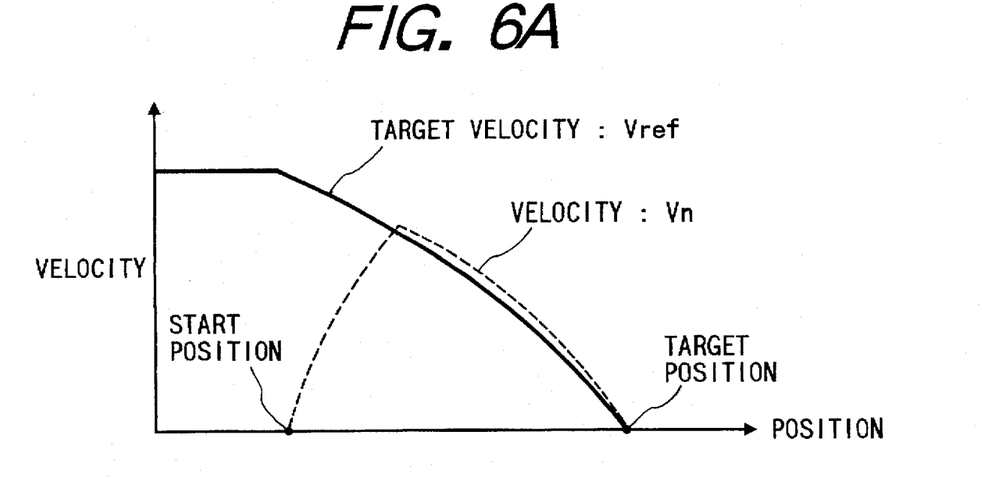
FIGS. 6A and 6B are graphs for explaining the velocity control method upon seeking of an optical head in the embodiment shown in FIG. 2.
Figure 6B:
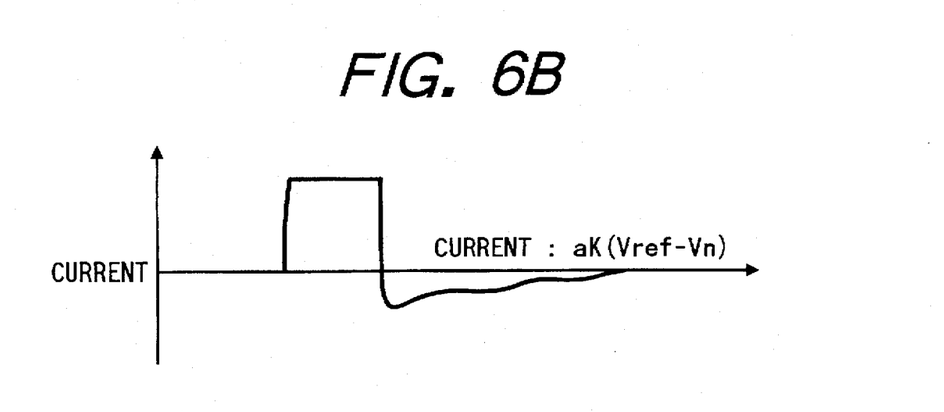

Velocity control upon a seek action of the optical head will be explained below. As a control method of moving the optical head to the target position on the magneto-optical disc 16, a velocity control method is normally used. As the velocity control method, a method of sequentially monitoring the velocity of the optical head and performing a seek action of the optical head in accordance with a predetermined operation plan is popular. FIGS. 6A and 6B are graphs showing the relationship between the target velocity and the actual velocity (FIG. 6A) and the current to be applied to the actuator 12b for driving the carriage (FIG. 6B) in the general velocity control method. Referring to FIG. 6A, the target velocity $V_{ref}$ represents the velocity of the operation plan of the head, and is calculated in correspondence with the remaining distance to the target position. The target velocity $V_{ref}$ is calculated by the formula below:

$$V_{ref}=(2\cdot\alpha(S-\lambda/2\cdot N))^{1/2} \qquad (1)$$

where S is the target moving distance, $\lambda$ is the track pitch, $\alpha$ is the decelerating acceleration, and N is the zero-crossing count value. In order to control the head velocity to trace the target velocity, the current velocity of the head is sequentially detected. In this case, the method of detecting the current velocity $V_n$ of the head is normally divided into high- and low-velocity ranges. More specifically, in the high-speed range, the track count method is used, and the current velocity is calculated based on the number, N, of tracks that the head crosses during a predetermined sampling interval $T_S$. That is, $$V_n=(\lambda/2N)/T_s \qquad (2)$$

On the other hand, in the low-speed range, the track interval count method is used. In this method, a zero-crossing point of a tracking error signal is detected, and time $T_d$ from the detected zero-crossing point to the next zero-crossing point is measured. In this case, since the distance between the zero-crossing points is ½ the track pitch $\lambda$, the velocity in this range is given by formula (3) below:

$$V_n=(\lambda/2)/T_d \qquad (3)$$

Upon selection of either velocity detection method, when the current velocity is higher than a predetermined velocity value, the high-velocity range is used; otherwise, the low-velocity range is selected. When the head velocity is controlled, the instruction value of the actuator is calculated based on the current velocity and the target velocity at that time at a predetermined time period, and the head velocity is controlled by the calculated instruction value. In this manner, the relative velocity between the disc surface and the head is sequentially detected using the track count or the tracking error signal in the velocity detection method, and the head is sequentially controlled in accordance with the target velocity calculated from formula (1). In particular, the target velocity $V_{ref}$ shown in FIG. 6A is prepared in advance in a memory as a target velocity table in the apparatus using digital servo control according to this embodiment. The target velocity table stores velocity values calculated from formula (1) with respect to the remaining distance (i.e., the number of remaining tracks). In this embodiment, the seek action of the optical head to the target position is performed by the above-mentioned velocity control method in accordance with the predetermined operation plan.

Figure 7:
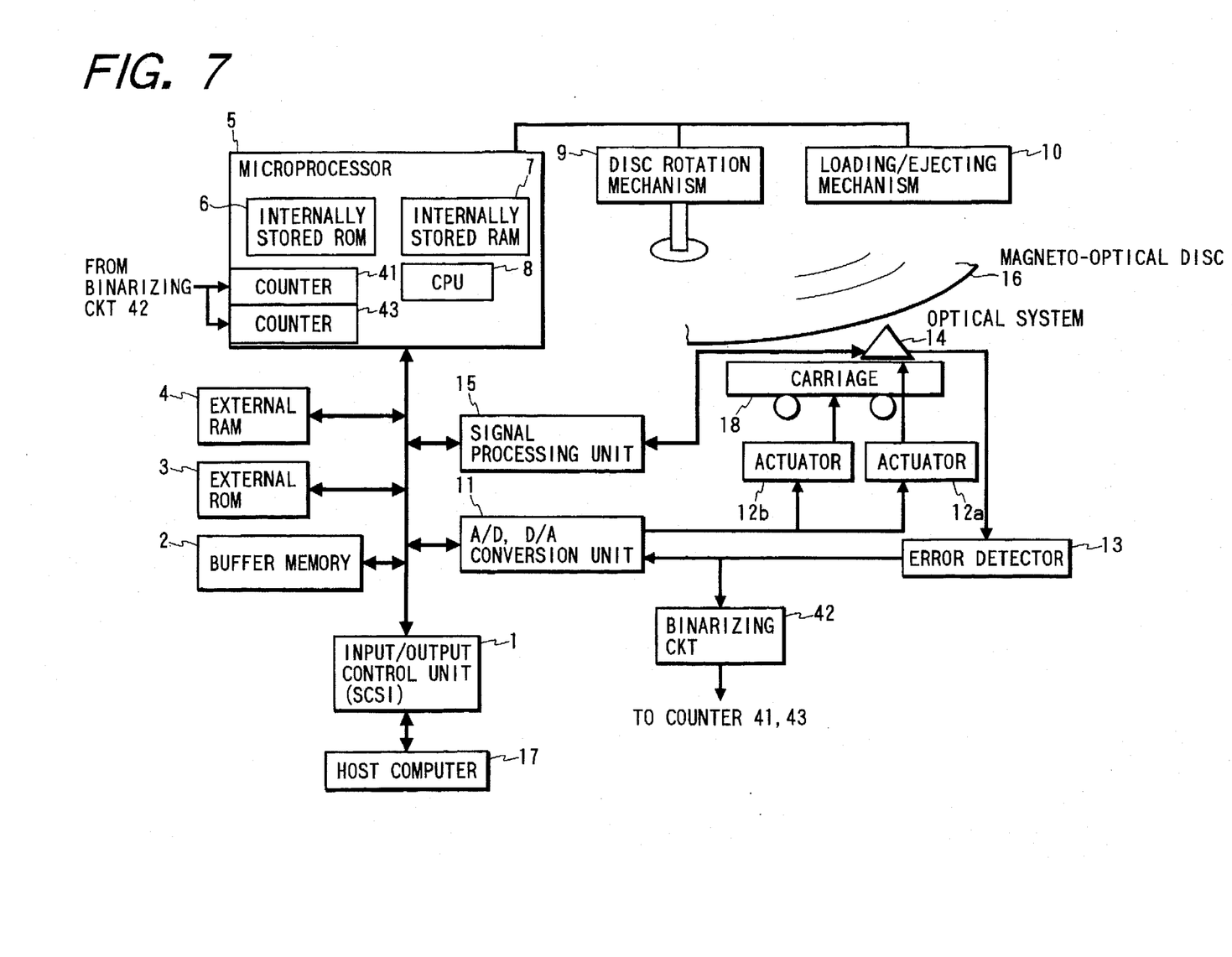
FIG. 7 is a block diagram showing the second embodiment of the present invention.

FIG. 7 is a block diagram showing the second embodiment of the present invention. In this embodiment, a counter 43 for detecting the head velocity is arranged in the microprocessor 5 in addition to the counter 41. In order to execute velocity control during a seek action of the optical head, the moving velocity of a laser beam must be detected by some means. In this embodiment, the velocity detection is attained by the counter 43 incorporated in the microprocessor 5. More specifically, the counter 41 counts tracks by counting events, while the velocity detection counter 43 counts events at predetermined time intervals in a high-velocity range, and measures the inverted interval time of a binarized signal of the tracking error signal (timer operation) in a low-velocity range, as has been described in the velocity control above. The microprocessor 5 calculates the moving velocities of a laser beam in the high- and low-velocity ranges on the basis of these results. Note that other arrangements are the same as those in FIG. 2. As will be described later, when the velocity detection counter 43 detects a predetermined velocity in the seek action, control is made to set the data clock and to start address reproduction.

Figure 8:
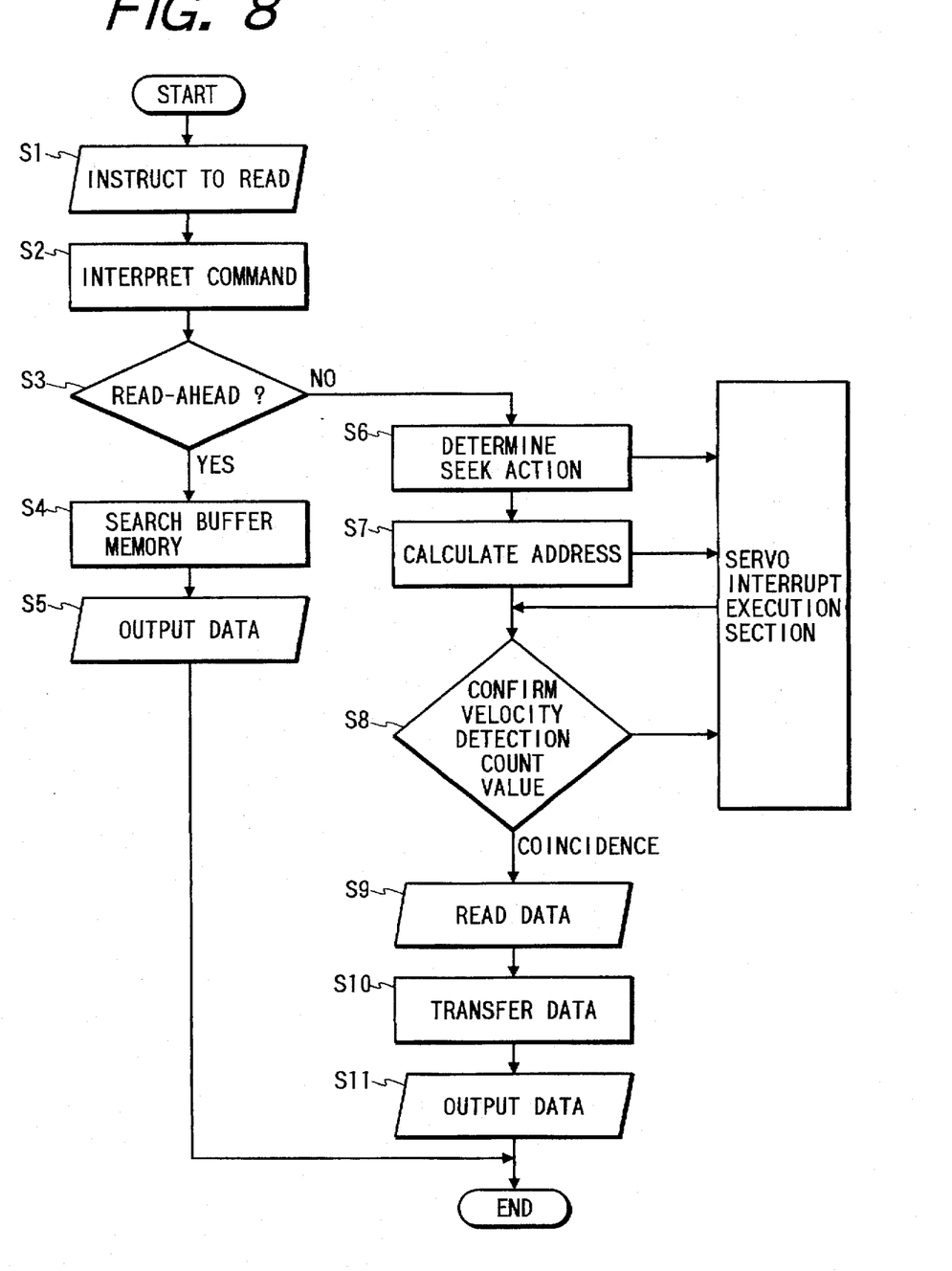
FIG. 8 is a flow chart showing the action of the embodiment shown in FIG. 7.

FIG. 8 is a flow chart showing the control action upon reading of data in the embodiment shown in FIG. 7. Note that the processing in steps S1 to S7 in FIG. 8 is the same as that shown in FIG. 3, and a detailed description thereof will be omitted. In this embodiment, the buffer monitoring task confirms the velocity detection count value of the velocity detection counter 43 (S8). If it is determined as a result of confirmation that the moving velocity of the laser beam becomes equal to or lower than a predetermined velocity, a data clock is set and address data is reproduced. In this case, since a low velocity is detected in practice, the setting action of the data clock and address reproduction are started under the condition that the inverted interval time of the binarized signal of the tracking error signal in the velocity detection method in the low-velocity range is equal to or larger than a predetermined value. This processing is started using an interrupt signal generated when the velocity detection counter 43 detects a velocity equal to or lower than a predetermined velocity.

Since address reproduction and data reproduction are realized only when the track crossing velocity is low, it is detected if the moving velocity of a laser beam becomes low, and thereafter, the processing is started. For this reason, processing can be prevented from being wastefully executed when it is not required, and the CPU power can be effectively utilized.

Figure 9:
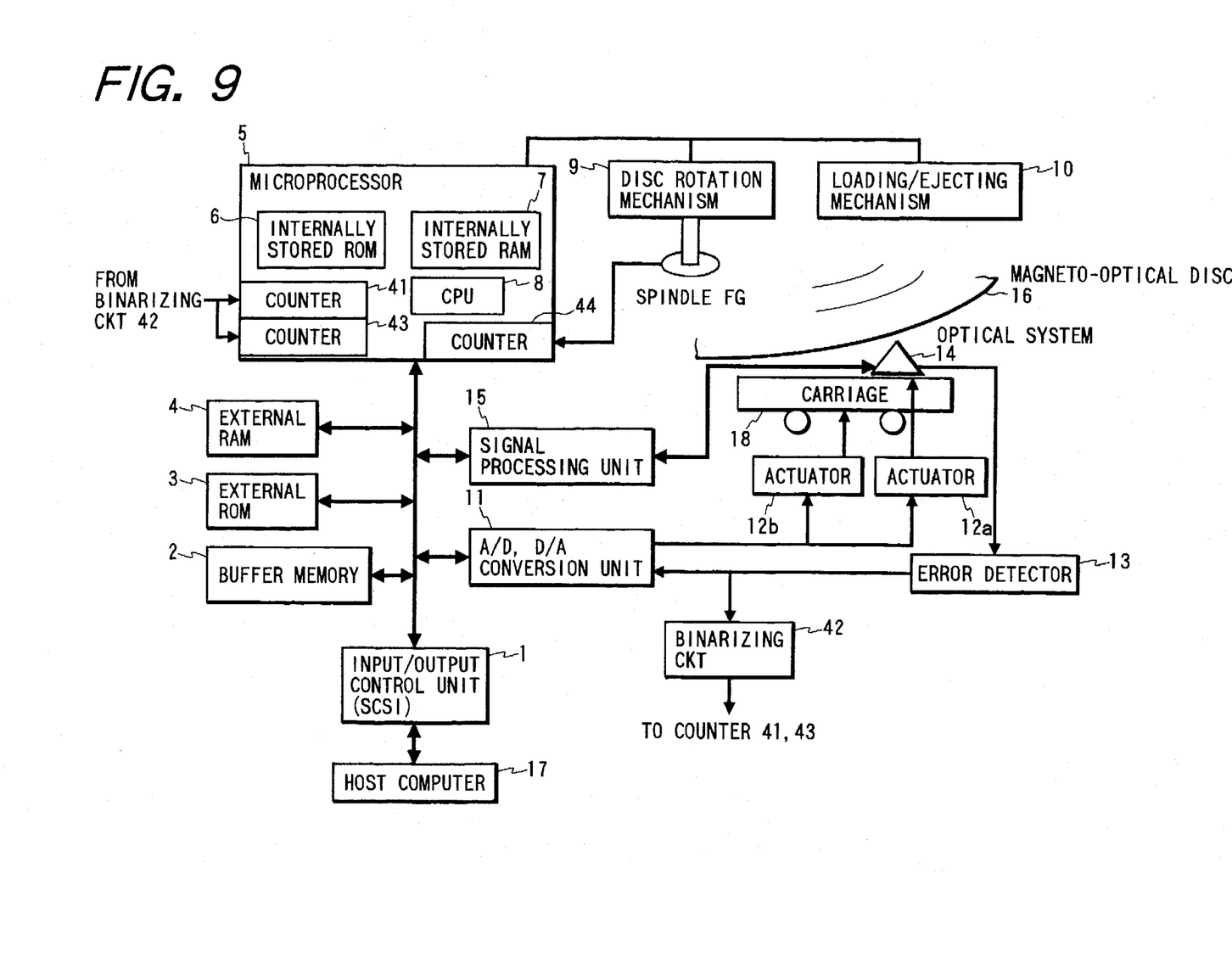
FIG. 9 is a block diagram showing the third embodiment of the present invention.

FIG. 9 is a block diagram showing the third embodiment of the present invention. In this embodiment, a spindle FG (encoder) for outputting, e.g., 36 pulses per revolution so as to detect the rotational phase of the magneto-optical disc 16 is attached to the disc rotation mechanism 9. A counter 44 for counting signals output from the spindle FG is arranged in the microprocessor 5, so that the microprocessor 5 can always recognize the rotation phase of the magneto-optical disc 16 on the basis of the count value. More specifically, the microprocessor 5 stores the position of sector 0 in association with the phase of the rotation phase counter 44 upon exchange of the disc or upon activation of the apparatus.

Assume that sector 0 corresponds to a count value "10" of 36 (0 to 35) pulses per revolution. If the host computer 17 issues an instruction to read data on, e.g., sector 4 on the 1,000-th track, and the total number of sectors of the 1,000-th track is 18, the fourth sector corresponds to "18" (10+(36/18)×4=18) in rotational phase. For this reason, it is determined that the fourth sector is present near the count value "18" of the rotation phase counter 44.

By utilizing this principle, control for determining the reading order of data is performed in correspondence with the rotational phase. More specifically, when a seek action is started as in the above embodiment, the optical head approaches the target track under the velocity control in the interrupt processing, and the velocity detection counter 43 detects a prescribed low velocity, the buffer monitoring task refers to the rotation phase counter 44. Since the arrival time from the prescribed velocity to the target track is almost constant, the arrival sector number can be predicted on the basis of the arrival time and the rotational speed and phase of the disk. For example, if the rotational speed of the magneto-optical disc 16 is 3,600 rpm, the rotation phase advances by 2.16 ((60 Hz×36)/1,000) per ms. Therefore, if the decelerating acceleration is 30 m/s², when the prescribed velocity is assumed to be 30 mm/s, it is determined that the optical head will arrive at a sector about two rotational phases ahead, 1 ms after the arrival time.

Therefore, by referring to the rotation phase counter 44 upon detection of the prescribed velocity of 30 mm/s, if the count value of the rotation phase counter 44 is about 10, it is seen that the optical head arrives at a position slightly before target sector 4. Therefore, the seek action to the initially set target track is continued. After an elapse of the rotational wait time to target track 4, data is read, data on sectors following sector 4 are read ahead as needed, and these data are stored in the buffer memory 2. In this manner, when the head arrives at a sector before the target sector, normal data reproduction is performed. On the other hand, when the count value of the rotation phase counter 44 is about 18 to 30, and the head overshoots target sector 4 upon arrival, data on sectors following target sector 4 are read ahead during the rotation wait time to target sector 4. More specifically, since the head reaches a sector after target sector 4, data on sectors following target sector 4 are read ahead and are stored in the buffer memory. After an elapse of the rotation wait time of the disc, data on target sector 4 is read.

Since this processing alters the target track to a track before or after the target sector in practice, it is attained by directly instructing a seek action in the interrupt processing such that the buffer monitoring task corrects the value of the counter 41. As described above, in this embodiment, data on sectors after sector 4 can be read ahead before the optical head reaches target track 4, and the wasteful rotation wait time can be effectively utilized. This effect is remarkable when the cache effect of the read-ahead access is high. In addition, by acquiring, in advance, data where a cache hit occurs, the rotation wait time can be greatly reduced effectively. In the above description, a case has been exemplified wherein the arrival time is 1 ms after detection of the prescribed low velocity. Even when the arrival time is about 5 or 10 ms, the above-mentioned control can be realized by a similar calculation method. Therefore, in consideration of the response speed of the seek action, the value of the counter 41 is preferably corrected as early as possible.

The fourth embodiment of the present invention will be described below.

This embodiment relates to the data recording action executed after the seek action.

When the host computer 17 issues a data write instruction, the microprocessor 5 recognizes the instruction, and starts processing required for recording.

First, the optical head is moved to a sector to be subjected to reading. This action is equivalent to the seek action executed when a read-ahead buffer hit does not occur, as described in the above embodiment.

The servo task executes a seek action. Upon completion of the seek action, the buffer monitoring task collates the read address with a sector address to be subjected to recording. When it is detected that the sector address to be subjected to recording coincides with the sector address where the laser beam is actually irradiated, data recording is performed.

In practice, a data-modulated signal is supplied to a laser drive circuit to modulate the amount of a laser beam, thus recording the data on a medium.

Of course, the interrupt processing section is executing the digital servo control for positioning a laser beam on the target track at this time. The interrupt processing section controls a laser beam to trace the track by driving the objective lens on the basis of a tracking error signal indicating the displacement between the track and the laser beam. The tracking error signal can be obtained by receiving light reflected by the disc by a sensor which is divided into a plurality of portions, photoelectrically converting the outputs from these portions, and performing a calculation using these photoelectric conversion outputs. For example, the push-pull method, which is known to those who are skilled in the art, can be used.

The interrupt processing section checks the magnitude of the tracking error signal to check if the tracking action is normally performed. In FIG. 2, the tracking error signal is output from the error detector 13, and is converted by the A/D, D/A conversion unit 11 into digital data. In the interrupt processing routine, the microprocessor 5 checks the amplitude of the digital tracking error signal to check if the amplitude of the digital tracking error signal exceeds a predetermined range.

Figure 10:
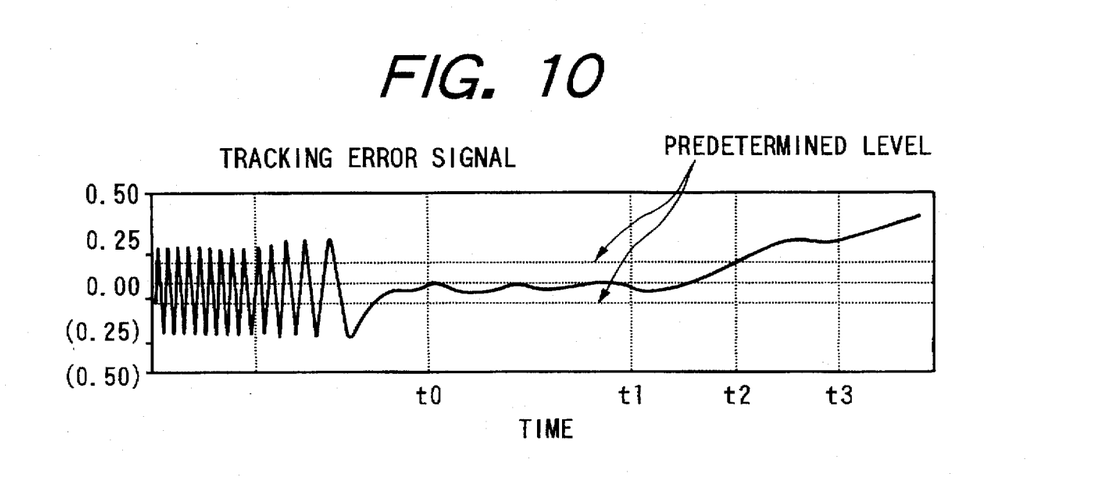
FIG. 10 is a graph showing the tracking error signal in the recording action according to the fourth embodiment of the present invention.

FIG. 10 shows the tracking error signal during the action. An initial portion in FIG. 10 corresponds to the waveform obtained when the laser beam crosses tracks during a seek action. At time t0, the seek action ends and tracking servo control is started, thus setting a tracking state. Thereafter, the sector address coincides with the recording start address, and data recording is started from time t1. At this time, if an external vibration is applied to the apparatus, the laser beam begins to deviate from the center of the track. Thus, the level of the tracking error signal increases. Since the level of the tracking error signal exceeds a predetermined value at time t2, the microprocessor 5 makes the above-mentioned decision. When the microprocessor 5 determines that the level of the tracking error signal exceeds the predetermined range, it increments the contents of the counter 41 in the microprocessor.

As has been described above, the servo interrupt period is 20 μsec. At this interrupt period, the microprocessor checks if the level of the tracking error signal exceeds the predetermined range, and increments the counter if the predetermined range is exceeded. When the level of the tracking error signal falls within the predetermined range, the microprocessor decrements the contents of the counter or clears the counter to zero.

In this manner, the microprocessor monitors if the level of the tracking error signal exceeds the predetermined range, and increments the counter if the predetermined range is exceeded, thereby checking if the laser beam deviates from the track.

On the other hand, the buffer monitoring task monitors the counter 41 parallel to the servo interrupt processing. It is checked if the count value is equal to or larger than a setting value. If the count value is equal to or larger than the setting value, i.e., the tracking error signal is larger than the predetermined value for a predetermined period of time or longer, it is determined that abnormal tracking is being performed, and a tracking error has occurred.

Since the setting value of the counter as a criterion for determining abnormal tracking is, e.g., 200 μsec, i.e., 20-μsec samples, which corresponds to the time in which the laser beam cannot reach a neighboring track, a count value "10" is set. This setting value is determined depending on the characteristics of the apparatus, especially, the characteristics of the servo system, the characteristics with respect to a vibration, and the like.

The buffer monitoring task stops recording modulation of the laser drive circuit, i.e., restores the laser power to low power as non-recording laser power. A sector corresponding to abnormal tracking is stored, and a retry action for recording data to be recorded there again is started.

In the retry action, recording is performed again by performing a seek action of the optical head to the sector address corresponding to, e.g., the abnormal tracking or returning to the recording start address.

In this manner, since the system processing section monitors the counter 41, it can quickly perform recognition of a tracking error and recovery processing of any abnormality. In this embodiment, the above description has been made using the tracking servo control. It is easy for those who are skilled in the art to apply a similar method to the detection and abnormality processing of a focusing servo error.

Even in a reproduction action, an access to a sector to be subjected to reproduction, data reproduction, servo error detection during the reproduction, and recovery processing upon generation of an abnormality are performed in the same manner as in the above-mentioned recording action, thus realizing a quick retry action.

What is claimed is:

1. An information recording/reproducing apparatus for executing recording of information on and/or reproduction of information from a recording medium, upon reception of an instruction from a host computer, said apparatus comprising:

a single calculation means for, alternatively and time-divisionally, performing (i) a system processing for handling the instruction from the host computer and (ii) a seek processing for moving an information reproduction head to a target track; and a counter, incorporated into said calculation means, wherein, in the seek processing, the number of tracks which the head has traversed is counted, and, in the system processing, the number of tracks thus counted is monitored and the information to be reproduced by the head is prepared based on the monitored number of tracks.

2. An apparatus according to claim 1, wherein the preparation for the information reproduction is to set a data clock.

* * * * *